(12) United States Patent
Chen et al.

(10) Patent No.: US 7,467,157 B1
(45) Date of Patent: Dec. 16, 2008

(54) GENERATION OF SEMANTICALLY VALID XPATH EXPRESSIONS

(75) Inventors: Wallace Chen, Markham (CA); Ciby Mathew, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/841,099

(22) Filed: Aug. 20, 2007

(51) Int. Cl.
*G06F 17/30* (2006.01)

(52) U.S. Cl. .................................. 707/102; 707/103 R

(58) Field of Classification Search ................ 707/100, 707/101, 102, 103 R, 103 X, 103 Y, 103 Z; 706/13; 715/114, 115, 116, 239, 967
See application file for complete search history.

(56) References Cited

U.S. PATENT DOCUMENTS

| | | | | |
|---|---|---|---|---|
| 2006/0167869 | A1* | 7/2006 | Jones | 707/4 |
| 2007/0288429 | A1* | 12/2007 | Liu et al. | 707/3 |
| 2008/0097974 | A1* | 4/2008 | Chen et al. | 707/4 |

OTHER PUBLICATIONS

Torsten Grust et al., "Accelerating XPath Evaluation in Any RDBMS" (Mar. 2004), ACM, NY, NY, vol. 29, No. 1, pp. 1-43, http://www.inf.uni-konstanz.de/bdis/publications.*

W3C, XML Schema Part 0: Primer, W3C Recommendation, May 2, 2001, http://www.w3.org/TR/2001/REC-xmlschema-0-20010502/, 74 pages.
W3C, XML Path Language (XPath) 2.0, W3C Recommendation Jan. 23, 2007, http://www.w3.org/TR/xpath20/, 128 pages.

* cited by examiner

*Primary Examiner*—Diane Mizrahi
(74) *Attorney, Agent, or Firm*—Cantor Colburn LLP; Justin Dillon

(57) ABSTRACT

A method for automatically generating semantically valid XPath expressions in a computer system is provided. The method includes populating an instance of a sequence-type model by organizing XML data into a hierarchical structure consistent with the sequence-type model. The method also includes priming the instance of the sequence-type model to remove ambiguities and redundancies, while retaining semantic validity of the instance of the sequence-type model. The method further includes scanning the instance of the sequence-type model to identify one or more location paths that match a search pattern, where an initial scan originates at a root of the hierarchical structure and subsequent scans originate from a termination point of a prior scan to incrementally search for location steps by searching along XPath axes. The method additionally includes determining whether a sequence type at each location step matches the search pattern and outputting a result as semantically valid XPath expression output.

7 Claims, 3 Drawing Sheets

GENERATION OF SEMANTICALLY VALID XPATH EXPRESSIONS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer-based automated expression generation, and particularly to generating semantically valid eXtensible Markup Language (XML) path (XPath) expressions.

2. Description of Background

XPath is an expression language that allows the processing of values conforming to a defined data model. The data model provides a tree representation of eXtensible Markup Language (XML) documents as well as atomic values such as integers, strings, and Booleans, and sequences that may contain both references to nodes in an XML document and atomic values. The result of an XPath expression may be a selection of nodes from input documents, an atomic value, or more generally, any sequence allowed by the data model. XPath provides a means of hierarchically addressing the nodes in an XML tree using a path expression. XPath can take advantage of the type information that may be available when documents are validated using the XML Schema language, as defined by the World Wide Web Consortium (W3C). Since XML is a widely used language for a variety of applications with varying levels of hierarchical complexity, XPath has become an important tool to navigate through the hierarchical structure of an XML document using a compact, non-XML syntax.

As applications are developed that consume and process XPath expressions, such as XQuery engines to extract data from XML documents, many test cases must be developed to verify proper performance. To reduce development time and expense while providing robust test coverage of such applications, it would be beneficial to develop a method to automatically produce semantically valid XPath expressions. Such an automated approach could support development of a large number of test cases in a short period of time, covering a substantial amount of functionality provided through XPath expressions. Accordingly, there is a need in the art for a method to automatically generate semantically valid XPath expressions.

SUMMARY OF THE INVENTION

The shortcomings of the prior art are overcome and additional advantages are provided through the provision of a method for automatically generating semantically valid XPath expressions in a computer system. The method includes populating an instance of a sequence-type model by organizing eXtensible Markup Language (XML) data into a hierarchical structure consistent with the sequence-type model. The method also includes priming an instance of the sequence-type model to remove ambiguities and redundancies, while retaining semantic validity of the instance of the sequence-type model. The method further includes scanning the instance of the sequence-type model to identify one or more location paths that match a search pattern, where an initial scan originates at a root of the hierarchical structure and subsequent scans originate from a termination point of a prior scan to incrementally search for location steps by searching along XPath axes. The method additionally includes determining whether a sequence type at each location step matches the search pattern to form scan results and outputting the scan results as semantically valid XPath expression output.

A computer program product corresponding to the above-summarized method is also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECT

As a result of the summarized invention, technically we have achieved a solution which automatically generates semantically valid eXtensible Markup Language (XML) path (XPath) expressions.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments, as shown and described by the various figures and the accompanying text, provide methods and computer program products for automatically generating semantically valid XPath expressions. XPath expressions provide a means of hierarchically addressing nodes in a tree representation of an eXtensible Markup Language (XML) document. Through automatic generation of semantically valid XPath expression, test cases using XPath expressions can quickly be generated to support software development, such as testing of a query processing engine to evaluate XPath expressions and generate results. In exemplary embodiments, an XPath generator searches a prescribed input for a pattern, and produces XPath expressions, which may be used directly or in the context of another language, e.g. XQuery. Optionally, the resulting XPath expressions may be post-processed to add expressions and constraints, in order to increase test coverage. The inventive principles disclosed herein enable rapid generation of a large volume of varied test cases to test the functionality of an XPath processing engine, such as a query processing engine.

Figure 1:
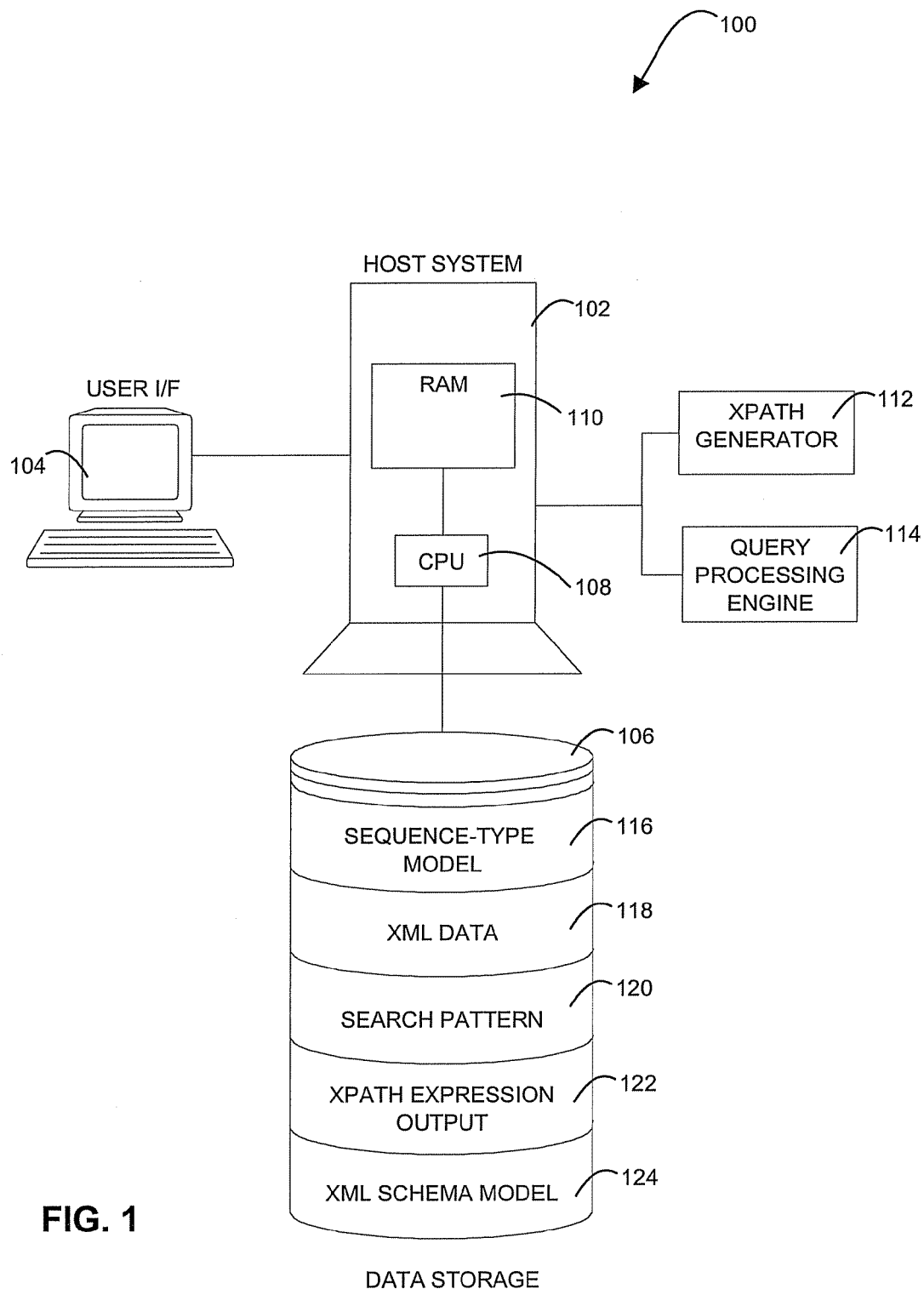
FIG. 1 depicts an example of a computer system for automatically generating semantically valid XPath expressions.

Turning now to the drawings, it will be seen that in FIG. 1 there is a block diagram of a system 100 for automatically generating semantically valid XPath expressions that is implemented in accordance with exemplary embodiments. The system 100 of FIG. 1 includes a host system 102 in communication with a user interface 104 and a data storage device 106. The host system 102 may be any type of computer system known in the art. For example, the host system 102 can be a desktop computer, a laptop computer, a general-purpose computer, a mainframe computer, or an embedded computer (e.g., a computer within a wireless device). In exemplary embodiments, the host system 102 executes computer readable program code. While only a single host system 102 is shown in FIG. 1, it will be understood that multiple host systems can be implemented, each in communication with one another via direct coupling or via one or more networks. For example, multiple host systems 102 may be interconnected through a distributed network architecture. The single host system 102 may also represent a server in a client-server architecture.

In exemplary embodiments, the host system 102 includes at least one processing circuit (e.g., CPU 108) and volatile memory (e.g., RAM 110). The CPU 108 may be any processing circuit technology known in the art, including for example, a microprocessor, a microcontroller, an application specific integrated circuit (ASIC), a programmable logic device (PLD), a digital signal processor (DSP), or a multi-core/chip module (MCM). The RAM 110 represents any volatile memory or register technology that does not retain its contents through a power/depower cycle, which can be used for holding dynamically loaded application programs and data structures. The RAM 110 may comprise multiple memory banks partitioned for different purposes, such as data cache, program instruction cache, and temporary storage for various data structures and executable instructions. It will be understood that the host system 102 also includes other computer system resources known in the art, and not depicted, such as one of more power supplies, clocks, interfacing circuitry, communication links, and peripheral components or subsystems.

The user interface 104 includes a combination of input and output devices for interfacing with the host system 102. For example, user interface 104 inputs can include a keyboard, a keypad, a touch sensitive screen for inputting alphanumerical information, or any other device capable of producing input to the host system 102. Similarly, the user interface 104 outputs can include a monitor, a terminal, a liquid crystal display (LCD), or any other device capable of displaying output from the host system 102.

The data storage device 106 refers to any type of storage and may comprise a secondary storage element, e.g., hard disk drive, tape, or a storage subsystem that is internal or external to the host system 102. In alternate exemplary embodiments, the data storage device 106 includes one or more solid-state devices, such as ROM, PROM, EPROM, EEPROM, flash memory, NOVRAM or any other electric, magnetic, optical or combination memory device capable of storing data (i.e., a storage medium), some of which represent executable instructions for the CPU 108. It will be understood that the data storage device 106 shown in FIG. 1 is provided for purposes of simplification and ease of explanation and is not to be construed as limiting in scope. To the contrary, there may be multiple data storage devices 106 utilized by the host system 102.

In exemplary embodiments, the host system 102 executes an XPath generator 112 and a query processing engine 114. The host system 102 may also execute other applications, operating systems, and the like. The XPath generator 112 relies on a sequence-type model 116 that types XML data 118, which it can search in order to produce results that match a search pattern 120. These results are XPath expression output 122 that can be used to test the ability of the query processing engine 114 to evaluate the expressions and produce query results. The XML data 118 can be described using the XML Schema language, which has syntax to describe the markup in a data document including type, structure and relationship. Various constructs in the XML Schema language are modeled using data structures that also reflect the hierarchical ordering in a schema. A schema document is a container of top-level definitions including elements, attributes, types, and groups. A schema document may itself import other schemas by way of composition. An element has a hierarchical structure whose leafs are elements or attributes of primitive types, and whose intermediate nodes are elements whose types are themselves hierarchical in structure. In addition, the model may reflect ordering within a node, or flag content as text mixed with markup, or constrain data values. An arbitrary XML schema model 124 may be composed as part of test case generation, and persisted (stored) in the data storage device 106 for use by the XPath generator 112. This persisted form is also shared with XML document and index generators (not depicted), and therefore serves as a basis for congruence of generated test artifacts.

Figure 2:
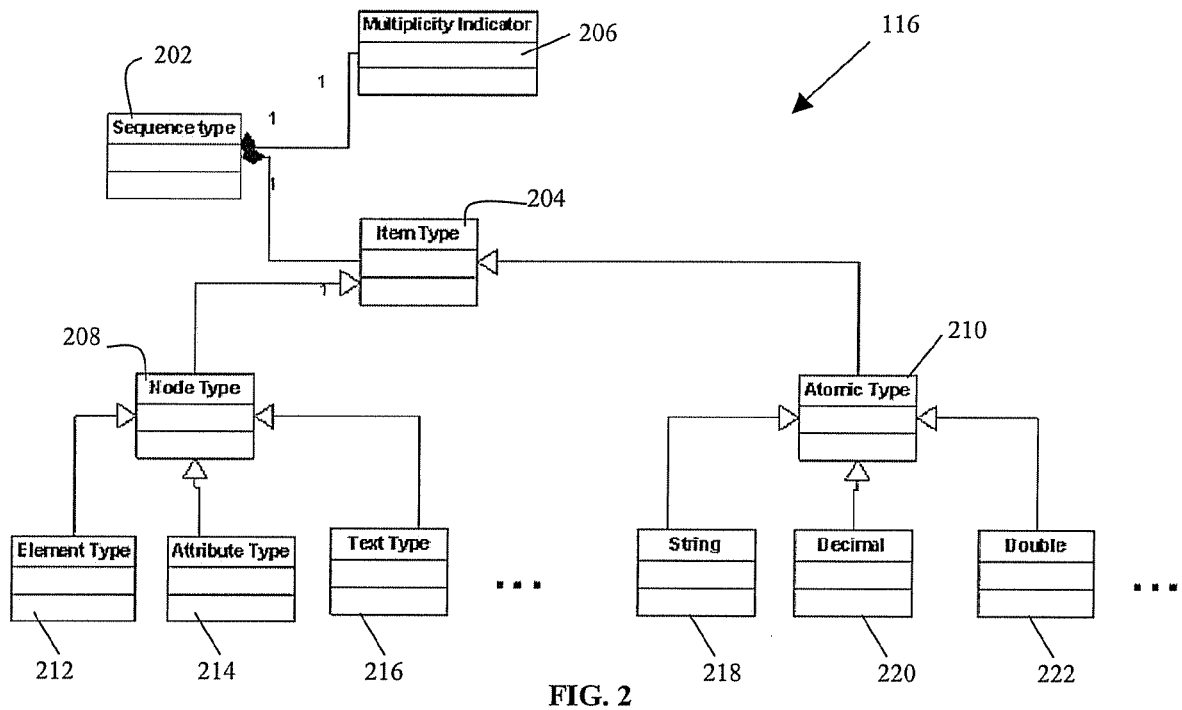
FIG. 2 depicts an example of a sequence-type model.

The XML schema model 124 can be transformed into an alternative form, referred to as the sequence-type model 116. The sequence-type model 116 is symmetrical to the XML schema model 124 except that it is formatted for convenience of searching. An exemplary sequence-type model 116 is depicted in FIG. 2, including various types related through aggregation and/or inheritance. At the top of the hierarchy of the sequence-type model 116, a sequence type 202 may include an item type 204 definition and a multiplicity indicator 206. The item type 204 definition is drawn from an item-type hierarchy of XML markup and primitive types. At the root of the hierarchy is the item type 204 which can characterize any kind of XML data 118, and which immediately specializes into a node type 208 that is generic for any kind of markup, and an atomic type 210, which characterizes primitive values. The node type 208 specializes into classes of markup types such as an element type 212, an attribute type 214, a text type 216 and other types (not depicted), e.g., comment, document, processing-instruction, schema-element and schema-attribute types. The atomic type 210 includes the primitive types of the XML Schema language, as well as several XQuery specific types, such as a string 218, decimal 220, double 222, and the like. The sequence-type model 116 also accommodates user-defined complex types that may be used to define the type of an element or schema-element. A complex type is a composite that may specify ordering and layout of child element definitions, and also may introduce attribute definitions. Some child elements may recursively be defined as complex types, therefore imparting a hierarchical structure to a top-level element definition.

Multiplicity reflects volume in a nodeset (i.e., a collection of nodes), the sequence type 202 definition evaluates in a query context, namely, whether the nodeset can be empty, or is a singleton, or has multiple values. The sequence-type model 116 can also characterize a heterogeneous nodeset, which is a collection of two or more distinct item types 204. In determining heterogeneity, duplicates in a collection of item types 204 are eliminated and the residual item types 204 are promoted to a least common ancestor in the item-type hierarchy. For instance, a collection of two element types 212 that are named differently, or which have incompatible type definitions, is factored into a node type 208. Alternatively, if the element types 212 have the same name and related types, they can be factored into a single element type 212 whose type definition is a least common ancestor. When factoring, the multiplicity indicator 206 assigned to the resulting sequence type 202 is the union of the component multiplicities, see table 1, where left and right operands are indices to the first column and first row respectively. For example, the result of reducing two sequence types 202, one of which is optional (represented as "?") and the other which occurs at least one time, is a sequence type 202 that occurs one or more times. Note that a heterogeneous sequence type 202 does not assume properties beyond that of its component sequence types 202. To elaborate, a node sequence type 202 consisting of two distinct element types 212 does not generalize to match a node type 208 other than the specific element types 212. The sequence-type model 116 can be applied to the specification of a pattern language for use in searching.

TABLE 1

Union of multiplicity indicators

|   | ? | 1 | * | + |
|---|---|---|---|---|
| ? | * | + | * | + |
| 1 | + | + | + | + |
| * | * | + | * | + |
| + | + | + | + | + |

Figure 3:
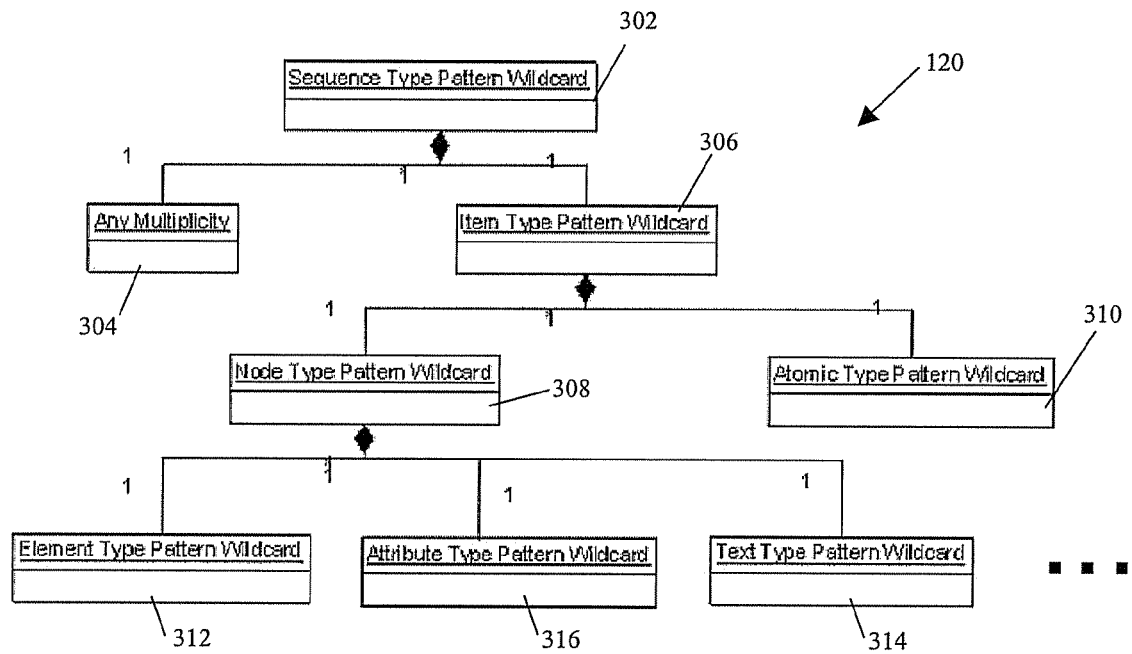
FIG. 3 depicts an exemplary hierarchical layout of a pattern wildcard.

Turning now to FIG. 3, an exemplary hierarchical layout of a pattern wildcard as the search pattern 120 is depicted in accordance with exemplary embodiments. A pattern language for sequence types 202 of FIG. 2 facilitates searching the sequence-type model 116 for a matching sequence type pattern 302. Patterns may be as generic as a wildcard that matches any item type of any multiplicity 304, or as specific as to match, for example, exactly one occurrence of an integer (not depicted). Although only a single example of the search pattern 120 is depicted in FIG. 3, it will be understood that many variations of search patterns are possible and included within the scope of this disclosure. In utilizing the search pattern 120, the XPath generator 112 performs a mapping between the hierarchy of the search pattern 120 and the sequence-type model 116. For example, an item type pattern 306 matches any type in the hierarchy of XML markup and primitive types, e.g., item type 204 and types that inherit from item type 204 of FIG. 2. A node type pattern 308 matches any markup type. An atomic type pattern 310 matches the corresponding type or its subtypes, e.g., atomic type 210 of FIG. 2. Each descendent of the node type pattern 308 matches the corresponding markup type, e.g. an element type pattern 312 matches an element type 212 of FIG. 2, and a text type pattern 314 matches a text type 216 of FIG. 2.

Element type patterns 312 and attribute type patterns 316 may require deeper analysis to determine that they match both name and type definition. Atomic type 210 definitions and, similarly, user-defined complex types, are tested for a match by determining that a type can be assigned to a type pattern by promoting or casting. Name or type wildcards are used where either name or type is unimportant or is unknown. For instance, the element type wildcard pattern 312 may be used to match any element type 212, or, more specifically, may be restricted to element types 212 of a certain type definition. From the description, it should be apparent that the item type tree of the sequence-type model 116 and the corresponding pattern tree of the search pattern 120 are symmetrical. When matching a sequence type pattern 302, the multiplicity indicator 206 of the sequence type 202 is tested for containment against the multiplicity indicator of the pattern, see table 2 where left and right values are indices to the first column and first row respectively. Stated together, a sequence type 202 is matched by a pattern only when both its item type 204 definition and multiplicity indicator 206 are matched by the pattern. This test of completeness can be scaled up to heterogeneous patterns where matching requires that every item type 204 definition contained in a possibly heterogeneous sequence type 202 matches at least one item type 204 definition in a possibly heterogeneous sequence type pattern 302 and, the multiplicity indicator 206 of the sequence type 202 must be contained in the multiplicity indicator of the pattern.

TABLE 2

Truth table showing compatibility of multiplicity indicators

|   | ? | 1 | * | + |
|---|---|---|---|---|
| ? | T | T | F | F |
| 1 | F | T | F | F |
| * | T | T | T | T |
| + | F | T | F | T |

An instance of the sequence-type model 116 may be primed by firming choices and removing inconsistencies that may exist in a global element. Priming involves decision-making that can identify an abstract tree from within the global element, i.e. one that is both unambiguous and semantically valid. Decision-making includes choosing from a choice model group, or firming the order in an all model group, or excluding an optional attribute, etc. Cyclic definitions, where a child in a tree references a parent, are detected during the decision-making phase and are eliminated if possible. One such case, that introduces a cycle, is a global element whose definition is incomplete because it contains a recursive element reference. Similar recursive references are possible through element or attribute group references, and type references. Such loops can be eliminated from the resulting sequence-type model 116 if the recursive reference belongs to an optional construct such as an alternative in a choice model group, or one that is marked optional by an occurrence indicator (e.g., minOccurs). A loop that cannot be eliminated may render the relevant element definition unusable. The decision algorithm may be deterministic in its outcome in order to ensure the same sequence type tree is used by query, data, and index generators. The primed instance in the sequence-type model 116 is candidate for XPath generation, where grouping and removal of cyclic definitions results in a simplified tree model to traverse. The primed instance and/or other instances of the sequence-type model 116 after decision-making may reside within the RAM 110 as dynamic structures for further analysis.

A search algorithm operates by scanning an instance of the sequence-type model 116 in order to identify location paths that match the search pattern 120. The instance of the sequence-type model 116 may be a modifiable copy of the sequence-type model 116 written to the RAM 110 to perform searching. An initial scan originates at the root of the hierarchy, and subsequent scans may originate from a prior scan termination point. A scan works its way incrementally by searching for location steps that can be discovered by searching along XPath axes leading from a location step. The scan may be applied for each of up to 12 (full axis feature) axes defined in the XPath language. For example, when applying a scan, a child scan yields the matching children of the location step, and a descendant scan yields matches from its sub-tree.

The results from a scan are obtained by applying the scan to each sequence type 202 member at a location step; as an example applying location step child::* may match more than one child element, e.g. child::e2 and child::e3, and the scan is applied to each child separately. The results are cumulated and categorized to yield a set of node tests. Note that this set includes a cumulative node test, the equivalent of all node tests that were matched. As an example consider a location step, an element sequence type 'e1', that has two element sequence types, 'e2', and 'e3' as children. A scan type along the child axis of 'e1' will yield a set of three node tests, namely 'child:e2', 'child:e3', and 'child:*', the latter being a composite sequence type consisting of both 'child:e2' and 'child:e3'. Each result from a scan may be recorded as an append, of both axis and node test, to the originating location step. Thus multiple XPath expressions may be derived from a search/scan depending upon a target sought and a starting position within the hierarchical structure. Scanning continues at the originating location step until the remaining axes have been traversed. Each resulting location step now becomes an origin for scanning to resume at. It is important to note that a scan may uncover location steps that have been visited, and which must be excluded from future scans to ensure that the scan terminates. The sequence type 202 at each location step is tested against the search pattern 120, and if a match is discovered the result is recorded to the XPath expression output 122. Scanning stops when the results are satisfactory or when the instance has been exhaustively searched, whichever is first.

The sequence-type model 116 may be composed manually, or by algorithmically exploring the syntax tree of the XML Schema language. The search pattern 120 may be similarly constructed and, as an optimization, some of that composition may be influenced by content in an instance of a sequence type model.

Location paths are a means to test the ability of the query processing engine 114 to retrieve and manipulate data, and the XPath generator 112 can help to quickly produce a large volume with syntactic variation to stress this capability. The coverage in these tests can be enhanced by adding filters to the location steps in order to restrict the results. Each location step is potentially a context step that may be filtered by a predicate. Exemplary filters include: a comparison of the context step against a literal value or relative location path, and an effective Boolean result of a function that accepts the context step as an argument. The XPath language is sufficiently expressive to scale up the complexity of these filters, a consideration that expands even further in the context of the XQuery language. A small set of predicates such as the comparison of context step with an XPath expression can be created to support filtering.

Location paths may be modeled as data structures and materialized as a text string for input to the query processing engine 114. Location steps store both an axis and a node test, which taken together are sufficient to relate a location step to its predecessor, such as relative child, parent, descendant, ancestor, and preceding relationships. An ordered collection of location steps is a location path. The originating step in a location path may be a variable that is bound at execution time to an XML document, and, regardless of subtle syntactic variations among vendors, the effect is to apply the location step to retrieve data from the document; the document may be one in a collection of related documents such as might be stored in a column of a relational table. Namespaces are used to qualify element and attribute names in node tests. The sequence-type model preserves the namespacing gleaned from the XML schema model, and maintains a mapping of prefix-URI pairs; the prefix is applied to qualify a name when a location path is materialized as a string. As an example that includes the various terms consider a location path: "child::ibm:employee/attribute::person:age[.<20]" which selects employees who are in their teenage years. The materialized XPath expressions may be persisted in a lookup table within the data storage device 106, which associates expression to a sequence-type tree, and which is a data source to XML data 118 and index generators, as well as test harnesses, i.e., an automated testing environment. Although the exemplary system 100 of FIG. 1 has been described as producing XPath expressions using the XPath generator 112 for testing the query processing engine 114, it will be understood that the XPath expression output 122 produced by the XPath generator 112 may be used for any number of purposes.

Figure 4:
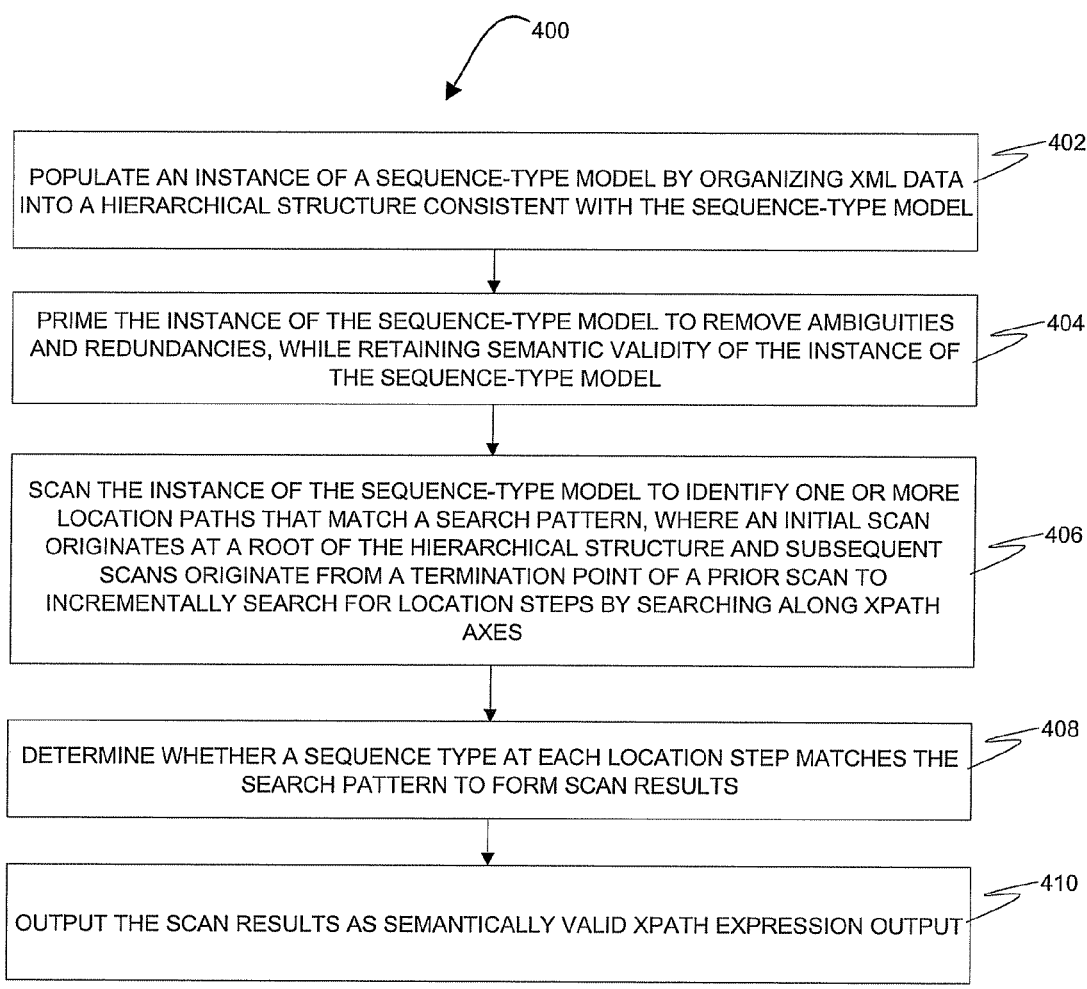
FIG. 4 depicts a process for automatically generating semantically valid XPath expressions in accordance with exemplary embodiments.

Turning now to FIG. 4, a process 400 for automatically generating semantically valid XPath expressions will now be described in accordance with exemplary embodiments, and in reference to the system 100 of FIG. 1. A user can perform the process 400 interactively through the host system 102 of FIG. 1. At block 402, the XPath generator 112 populates an instance of the sequence-type model 116 by organizing the XML data 118 into a hierarchical structure consistent with the sequence-type model 116. In exemplary embodiments, the sequence-type model 116 is a symmetrical alternate form of the XML schema model 124 that is formatted for searching convenience. As previously described in reference to FIG. 2, the sequence-type model 116 is a hierarchy of the multiplicity indicator 206 and the item type 204, where the item type 204 provides an inheritance definition for the node type 208, the atomic type 210, and respective subtypes.

At block 404, the XPath generator 112 primes the instance of a sequence-type model 116 to remove ambiguities and redundancies, while retaining semantic validity of the instance of the sequence-type model 116. Priming may also eliminate cyclic definitions, where children reference higher-level ancestors in the hierarchy.

At block 406, the XPath generator 112 scans the instance of the sequence-type model 116 to identify one or more location paths that match the search pattern 120. The initial scan originates at a root of the hierarchical structure and subsequent scans originate from a termination point of a prior scan to incrementally search for location steps by searching along XPath axes. The scanning may be applied to each axis as defined in the XPath language.

At block 408, the XPath generator 112 determines whether a sequence type, such as the sequence type 202 of FIG. 2, at each location step matches the search pattern 120 to form scan results. The XPath generator 112 may also perform filtering of a context step using a predicate, where the filtering is performed using a comparison of the context step against a literal value or relative location path.

At block 410, the XPath generator 112 outputs the scan results as semantically valid XPath expression output 122. The XPath generator 112 may also cumulate and categorize the scan results to yield a set of location paths that are semantically valid XPath expressions. The XPath generator 112 can output the semantically valid XPath expressions 122.

While it is desirable that the generated XPath expressions are semantically (implicitly also syntactically) valid, the expressions are not just useful to test a compiler, but very importantly to test the functioning of an XPath evaluation engine, including one that is embedded in an XQuery or index evaluation engine. When executed against a collection of XML documents the XPath sentences extract data from the documents, and the means to ensure matches is by sharing the same sequence-type model between the generators for XPath and XML data. The XML data generator instantiates one or more documents from a sequence-type model, and the hierarchical structure of the relevant sequence-type model is recalled when generating XPath so that the location paths in the XPath sentences reference actual nodes in the XML data documents. This is useful when testing the functionality and robustness, under concurrent stress, of an XPath (and XQuery if relevant) evaluation engine. The XML index generator wraps each location path, output by the XPath generator, inside a command to create an index. The index is evaluated when an XPath expression references indexed nodes, therefore test coverage expands to also include testing the functionality and robustness, under concurrent stress, of the index evaluation engine.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for automatically generating semantically valid XPath expressions in a computer system, comprising:
   populating an instance of a sequence-type model by organizing eXtensible Markup Language (XML) data into a hierarchical structure consistent with the sequence-type model;
   priming the instance of the sequence-type model to remove ambiguities and redundancies, while retaining semantic validity of the instance of the sequence-type model;
   scanning the instance of the sequence-type model to identify one or more location paths that match a search pattern, wherein an initial scan originates at a root of the hierarchical structure and subsequent scans originate from a termination point of a prior scan to incrementally search for location steps by searching along XPath axes;
   determining whether a sequence type at each location step matches the search pattern to form scan results;
   cumulating and categorizing the scan results to yield a set of location paths that are semantically valid XPath expressions, wherein the XPath expressions provide tests of functionality of an XPath evaluation engine, including one that is embedded in an XQuery and index evaluation engine, ensuring a shared sequence-type model between generators for XPath and XML data, and concurrent stress testing of the evaluation engines; and
   outputting the scan results as semantically valid XPath expression output.

2. The method of claim 1 wherein the sequence-type model is a symmetrical alternate form of an XML schema model that is formatted for searching convenience.

3. The method of claim 2 wherein the sequence-type model is a hierarchy of a multiplicity indicator and an item type, the item type providing an inheritance definition for a node type and an atomic type.

4. The method of claim 1 wherein the scanning is applied to each axis as defined in the XPath language.

5. The method of claim 1 further comprising:
   filtering a context step using a predicate, wherein the filtering is performed using a comparison of the context step against a literal value or relative location path.

6. The method of claim 1 wherein the priming eliminates cyclic definitions.

7. A method comprising:
   a storage medium executable by a computer processor for implementing the method comprising:
      populating an instance of a sequence-type model by organizing eXtensible Markup Language (XML) data into a hierarchical structure consistent with the sequence-type model;
      priming the instance of the sequence-type model to remove ambiguities and redundancies, while retaining semantic validity of the instance of the sequence-type model;
      scanning the instance of the sequence-type model to identify one or more location paths that match a search pattern, wherein an initial scan originates at a root of the hierarchical structure and subsequent scans originate from a termination point of a prior scan to incrementally search for location steps by searching along XPath axes;
      determining whether a sequence type at each location step matches the search pattern to form scan results;
      cumulating and categorizing scan results to yield a set of location paths that are semantically valid XPath expressions wherein the XPath expressions provide tests of functionality of an XPath evaluation engine, including one that is embedded in an XQuery and index evaluation engine, ensuring a shared sequence-type model between generators for XPath and XML data, and concurrent stress testing of the evaluation engines; and
      outputting the set of location paths as semantically valid XPath expression output.

* * * * *